(12) United States Patent
Chuang et al.

(10) Patent No.: US 7,851,033 B2
(45) Date of Patent: Dec. 14, 2010

(54) PHOTO-SENSITIVE ADHESIVE AND LIQUID CRYSTAL DISPLAY EMPLOYING THE SAME

(75) Inventors: Wen-Pin Chuang, Taipei County (TW);
Su-Mei Wei, Hsinchu (TW);
Kung-Lung Cheng, Hsinchu (TW);
Shih-Hsien Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 84 days.

(21) Appl. No.: 12/110,905

(22) Filed: Apr. 28, 2008

(65) Prior Publication Data

US 2009/0059154 A1   Mar. 5, 2009

(30) Foreign Application Priority Data

Aug. 30, 2007   (TW) .............................. 96132207 A

(51) Int. Cl.
*G03F 7/004* (2006.01)
*G03C 1/00* (2006.01)
*C08G 18/68* (2006.01)

(52) U.S. Cl. .................... 428/1.5; 428/1.55; 430/281.1; 430/284.1; 430/287.1; 430/288.1; 522/90; 522/96

(58) Field of Classification Search ............ 252/299.01, 252/299.5; 428/1.5, 1.55; 430/20, 270.1, 430/281.1, 284.1, 287.1, 288.1; 522/90, 522/96
See application file for complete search history.

(56) References Cited

U.S. PATENT DOCUMENTS

| 6,246,824 B1 * | 6/2001 | Vandeberg et al. .......... 385/128 |
| 2006/0187366 A1 * | 8/2006 | Sugimoto et al. ............. 349/10 |
| 2007/0104440 A1 * | 5/2007 | Kim et al. ................... 385/129 |

FOREIGN PATENT DOCUMENTS

| CN | 1277981 | | 12/2000 |
| JP | 63-83182 | * | 4/1988 |
| JP | 2000258785 | | 9/2000 |
| JP | 2001075109 | | 3/2001 |
| JP | 2001133796 | | 5/2001 |
| JP | 2001142086 | | 5/2001 |
| JP | 2001220499 | | 8/2001 |
| JP | 2002030201 | | 1/2002 |
| JP | 2003147281 A | * | 5/2003 |
| JP | 2003213067 | | 7/2003 |
| JP | 2003268351 | | 9/2003 |
| JP | 2003286473 | | 10/2003 |

OTHER PUBLICATIONS

Seki, et al., "Dichroic Azo Dyes for Guest-Host Liquid-Crystal Cell", Jpn. J. Appl. Phys. vol. 21, No. 1, p. 191, 1982.

* cited by examiner

*Primary Examiner*—Shean C Wu
(74) *Attorney, Agent, or Firm*—Muncy, Geissler, Olds & Lowe, PLLC

(57) ABSTRACT

A photo-sensitive adhesive for a flexible liquid crystal display is provided, comprising the following components: an urethane oligomer; a reactive monomer with phenyl group; and a photo-initiator. In an embodiment, the phenyl group of the reactive monomer has a weight ratio of 40 wt %, base on the total weight of the reactive monomer.

13 Claims, 3 Drawing Sheets

PHOTO-SENSITIVE ADHESIVE AND LIQUID CRYSTAL DISPLAY EMPLOYING THE SAME

BACKGROUND OF THE INVENTION

1. Field of the Invention

The invention relates to a photo-sensitive adhesive, and more particularly to a photo-sensitive adhesive for a liquid crystal display.

2. Description of the Related Art

Flexible liquid crystal displays occupy less space and are portable, making them an industry display of choice. Further, with the development and wide application of electronic products such as E-books, and PDAs, there has been increasing demand for reflective liquid crystal displays which consume less electric power and occupies less space. Therefore, a display with all the advantages of flexible liquid crystal displays and reflective liquid crystal displays is called for.

Flat plane displays employing plastic substrate (soft plate) are lighter, thinner, more impact resistant, sturdier, and more flexible than conventional flat panel displays employing glass substrate, and can display images while being flexed and be fabricated by a roll-to-roll manufacturing process, thereby substantially reducing manufacturing cost. However, there are many problems (such as limitations of manufacturing process and selections of plastic materials) which have to be overcome, in order for plastic substrates to substitute glass substrates in liquid crystal displays.

One of the most challenging problems for flexible displays is the suitability for adhesives for sealing plastic substrate. The conventional liquid crystal display sealant is unsuitable for sealing flexible substrates, since the conventional sealant is apt to result in various liquid crystal cell gaps and the peel-off of substrates in the flexible liquid crystal display.

Therefore, it is necessary to develop a novel adhesive for sealing flexible liquid crystal displays. Accordingly, the invention provides an adhesive, with a designed chemical structure, for sealing flexible liquid crystal displays, resulting in an increased adhesive strength (such as the adhesive strength between the liquid crystal capsules and plastic substrate) and a reduced driving voltage for the liquid crystal display.

BRIEF SUMMARY OF THE INVENTION

An exemplary embodiment a photo-sensitive adhesive for a liquid crystal display comprises an urethane oligomer, a reactive monomer comprising phenyl group, and a photo initiator.

According to another embodiment, the invention provides a photo-sensitive adhesive for flexible liquid crystal display. The photo-sensitive adhesive comprises 60-90% by weight of the urethane oligomer, 10-40% by weight of the reactive monomer comprising phenyl group, and 0.1-15% by weight of the photo initiator, based on 100% by weight of the urethane oligomer, reactive monomer, and the photo initiator.

According to yet another embodiment, the invention also provides a liquid crystal display comprising a first substrate and a second substrate, a liquid crystal capsule layer, wherein the liquid crystal capsule layer is formed between the first and second substrates, and a photo-sensitive adhesive as claimed in claim 1 coated on at least one of the first and second substrates and the liquid crystal capsule layer, thereby bonding the liquid crystal capsule layer with at least one of the first and second substrates.

The photo-sensitive adhesive for a liquid crystal display of the invention can have superior adhesive strength (shear strength and peel strength) between the adhesive molecules and the liquid crystal capsules and substrates without degraded the performance of the liquid crystal display due to designed chemical structures of the adhesive. Further, the adhesive can further comprise metal salts and reactive monomers comprising phenyl group to reduce the driving voltage and increase the performance of the liquid crystal display, thereby be suitable for applying in reflective flexible liquid crystal displays as photosensitive adhesive.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
FIGS. 1a-1e are cross sections of a method for fabricating a flexible liquid crystal display according to an embodiment of the invention.

The invention provides a photo-sensitive adhesive for sealing liquid crystal displays and reducing the driving voltage thereof. Further, the invention also provides a liquid crystal display employing the same, wherein the photo-sensitive adhesive is preferably suitable for flexible liquid crystal displays. It should be noted that, the molecules of the photo-sensitive adhesive have superior cohesive strength therebetween, resulting in high adhesive strength between substrates and liquid crystal capsule layers (filled with dichroic dye). Therefore, the cell gap among the liquid crystal cells can be maintained during flexing of displays. The photo-sensitive adhesive is suitable to be used for sealing flexible liquid crystal displays. Further, the adhesive of the embodiment of the invention can further comprise metal salts and high amounts of reactive monomers comprising phenyl group, resulting in reduction of volume resistance and driving voltage of the liquid crystal display.

The embodiments of the invention provide photo-sensitive adhesives, comprising:

60-90% by weight of urethane oligomer;
10-40% by weight of reactive monomer comprising phenyl group; and
0.1-15% by weight of photo initiator, based on 100% by weight of the urethane oligomer, reactive monomer, and the photo initiator.

The urethane oligomer can have a molecular weight of more than 20000. A urethane oligomer with higher molecular weight would increase the strength of the photo-sensitive adhesive due to the higher cohesive strength of the adhesive, when polymerization of the urethane oligomer and reactive monomer are under irradiation.

Further, the urethane oligomer can have an OH value of more than 40 since an increased OH value can enhance the adhesive strength between the adhesive and the substrate (or liquid crystal capsule layer).

The reactive monomer comprising phenyl group can be an acrylic monomer comprising phenyl group. Particularly, when increasing the weight ratio of the phenyl group, the driving voltage of the liquid crystal display is reduced. The liquid crystal display of the invention can have a driving voltage difference of 2.5~9V less than conventional liquid crystal displays when the phenyl group of the reactive monomer has a weight ratio of more than 40 wt % base on the total weight of the reactive monomer.

The reactive monomer and the urethane oligomer can perform a polymerization by means of the initiator under UV irradiation. The photo initiator can be diethoxy acetophenone, benzophenone, benzyl benzoin isobutyl ether, benzyl dimethyl ketal, 1-hydroxycyclohexyl phenyl ketone, diethyl thioxanthone, 2-ethyl anthraquinone, 2-hydroxy-2-methyl-1-phenylpropane-1-one, 1-(4-isopropylphenyl)-2-hydroxy-2-methylpropane-1-one, 2-methyl-[4-(meyhylthio)phenyl]-2-morpholino-1-propane, aromatic diazonium salts, triallysulfonium salts, diallyiodonium salts, triallylselenium salts of Lewis acid (as well as metallocene compounds) or combinations thereof.

The liquid crystal display can have superior flexibility by introducing internal force (such as introducing polar & non-polar functional groups, $\pi$ & $\pi$ interaction ·hydrogen bonding, and viscosity) between the adhesive molecules and the liquid crystal capsules. Further, the adhesive can further comprise metal salts to reduce the driving voltage and increase the performance of the liquid crystal display. The metal salts can be lithium slats, sodium salts, potassium salts or combinations thereof.

The invention provides a liquid crystal display, such as a flexible liquid crystal display. The following description is of the best-contemplated mode of carrying out the invention. This description is made for the purpose of illustrating the general principles of the invention and should not be taken in a limiting sense. The scope of the invention is best determined by reference to the appended claims.

Figure 1B:
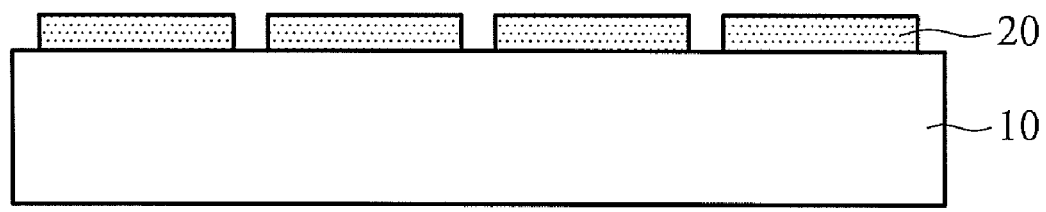

First, referring to FIG. 1a, a first substrate 10 is provided, wherein the first substrate 10 can be a glass or plastic substrate. Herein, the first substrate can be a PET substrate. The substrate 10 can optionally have no electrode or an electrode layer 20 as shown in FIG. 1b. The electrode layer can be transparent, such as ITO, IZO, AZO, or ZnO, and made by sputtering, or CVD or PECVD.

Figure 1C:
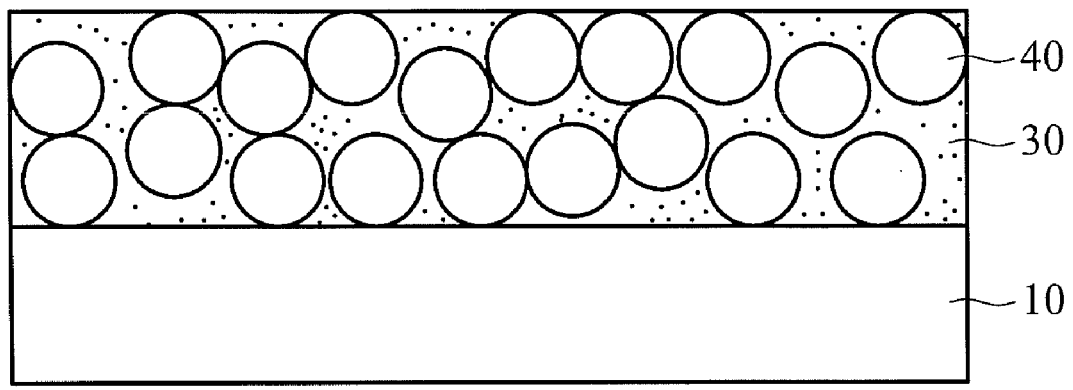

Next, referring to FIG. 1c, a liquid crystal capsule layer 30 is formed on the first substrate 10 (or electrode layer 20), wherein the liquid crystal capsule layer 30 comprising a plurality of liquid crystal capsules 40 comprises dichroic dye.

Figure 1D:
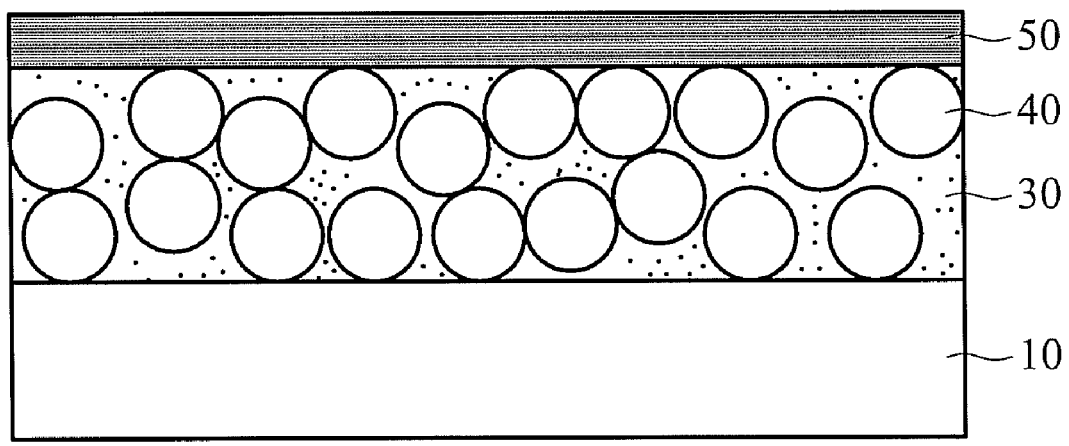

Next, referring to FIG. 1d, the photo-sensitive adhesive according to the invention is coated on the liquid crystal capsule layer 30 to form a photo-sensitive adhesive coating 50.

Figure 1E:
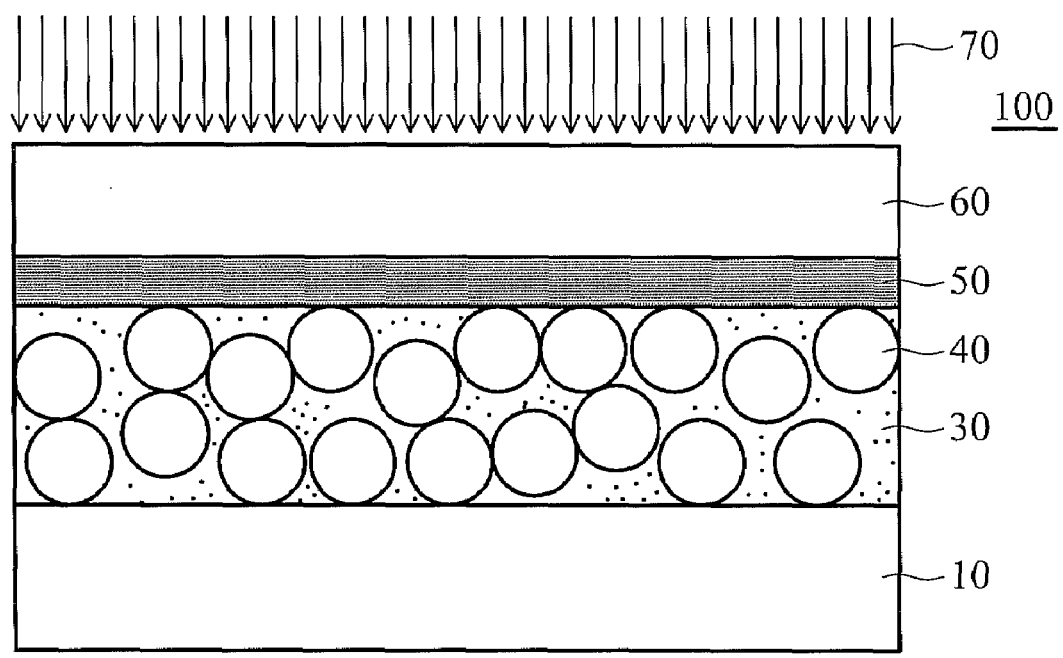

Finally, referring to FIG. 1e, a second substrate 60 is disposed on the photo-sensitive adhesive coating 50, and the photo-sensitive adhesive coating 50 is cured by UV light to hard the coating 50, thus obtaining a liquid crystal display 100 according to the invention.

The following examples are intended to illustrate the invention more fully without limiting their scope, since numerous modifications and variations will be apparent to those skilled in this art.

Strength Test of the Photo-Sensitive Adhesive

Photo-sensitive adhesive A ·photo-sensitive adhesive ·and NOA65 (sold and fabricated by Noland) were respectively mixed with 10 um spacers (Epostar L15), and the mixtures was coated on a PET substrate. Next, the strength (shear strength and peel strength) of each adhesives coated on the PET were measured by an Instron tensile strength tester. The components and OH value of the photo-sensitive adhesive A ·photo-sensitive adhesive B, and NOA65 and the results are listed in Table. 1.

TABLE 1

|  | photo-sensitive adhesive A | photo-sensitive adhesive B | NOA65 |
|---|---|---|---|
| Component | Acrylic amide | Acrylic amide | — |
| OH value | 47.9 | 43 | 30 |
| Mw | 73105 | 16921 | 1676 |
| Shear strength (Kgf/cm$^2$) | 9.37 | 9.49 | 6.80 |
| Peel strength (Kgf/2 cm) | 3.35 | 2.82 | 0.11 |

As shown in Table. 1, the photo-sensitive adhesive A had an OH value 1.6 times larger than that of NOA65, and had better shear strength and peel strength than that of NOA65. Specifically, the peel strength of the photo-sensitive adhesive A was more than 30 times lager than that of NOA65.

Driving Voltage Tests of the Liquid Crystal Display

A number of liquid crystal displays respectively packaged by different adhesives were fabricated according to the process as disclosed in FIGS. 1a-1e. Particularly, the first and second substrates were PET substrates, the liquid crystal capsule layer was the mixture of ZLI-1565 (sold by Merck) and anthraquinone dye (anthraquinone dye: ZLI-1565=1:9). The driving voltages V90 (voltage of 90% transparence) of the liquid crystal displays were respectively measured and are shown in table. 2.

TABLE 2

| Components of photo-sensitive adhesive | | | | |
|---|---|---|---|---|
| photo-sensitive adhesive | oligomer | reactive monomer | Initiator | Driving voltage (V$_{90}$) |
| NOA65 | PU acrylate 10 g (OH value: 30 molecular weight: 1676) | — | — | 22 |
| photo-sensitive adhesive C | EXC 282 (PU acrylate) 9 g (OH value: 42.95 molecular weight: 54734 | SR601 (14.1% phenyl group) 1 g | I-184 (Ciba) 0.1 g | 22.7 |

TABLE 2-continued

| | Components of photo-sensitive adhesive | | | |
|---|---|---|---|---|
| photo-sensitive adhesive | oligomer | reactive monomer | Initiator | Driving voltage ($V_{90}$) |
| photo-sensitive adhesive D | EXC 282 (PU acrylate) 8 g (OH value: 42.95 molecular weight: 54734 | SR601 (14.1% phenyl group) 2 g | I-184 (Ciba) 0.1 g | 21.8 |
| photo-sensitive adhesive E | EXC 282 (PU acrylate) 7 g (OH value: 42.95 molecular weight: 54734 | SR601 (14.1% phenyl group) 3 g | I-184 (Ciba) 0.1 g | 22.8 |
| photo-sensitive adhesive F | EXC 282 (PU acrylate) 6 g (OH value: 42.95 molecular weight: 54734 | SR601 (14.1% phenyl group) 4 g | I-184 (Ciba) 0.1 g | 22.3 |
| photo-sensitive adhesive G | EXC 282 (PU acrylate) 9 g (OH value: 42.95 molecular weight: 54734 | SR602 (14.1% phenyl group) 1 g | I-184 (Ciba) 0.1 g | 23 |
| photo-sensitive adhesive H | EXC 282 (PU acrylate) 8 g (OH value: 42.95 molecular weight: 54734 | SR602 (14.1% phenyl group) 2 g | I-184 (Ciba) 0.1 g | 23.8 |
| photo-sensitive adhesive I | EXC 282 (PU acrylate) 7 g (OH value: 42.95 molecular weight: 54734 | SR602 (14.1% phenyl group) 3 g | I-184 (Ciba) 0.1 g | 22.8 |
| photo-sensitive adhesive J | EXC 282 (PU acrylate) 6 g (OH value: 42.95 molecular weight: 54734 | SR602 (14.1% phenyl group) 4 g | I-184 (Ciba) 0.1 g | 22.3 |
| photo-sensitive adhesive K | EXC 282 (PU acrylate) 9 g (OH value: 42.95 molecular weight: 54734 | SR348 (33.6% phenyl group) 1 g | I-184 (Ciba) 0.1 g | 24.2 |
| photo-sensitive adhesive L | EXC 282 (PU acrylate) 8 g (OH value: 42.95 molecular weight: 54734 | SR348 (33.6% phenyl group) 2 g | I-184 (Ciba) 0.1 g | 23.6 |

TABLE 2-continued

| | Components of photo-sensitive adhesive | | | |
|---|---|---|---|---|
| photo-sensitive adhesive | oligomer | reactive monomer | Initiator | Driving voltage ($V_{90}$) |
| photo-sensitive adhesive M | EXC 282 (PU acrylate) 7 g (OH value: 42.95 molecular weight: 54734 | SR348 33.6% phenyl group) 3 g | I-184 (Ciba) 0.1 g | 22.5 |
| photo-sensitive adhesive N | EXC 282 (PU acrylate) 6 g (OH value: 42.95 molecular weight: 54734 | SR348 (33.6% phenyl group) 4 g | I-184 (Ciba) 0.1 g | 22.9 |
| photo-sensitive adhesive O | EXC 282 (PU acrylate) 9 g (OH value: 42.95 molecular weight: 54734 | SR339 (40.1% phenyl group) 1 g | I-184 (Ciba) 0.1 g | 18.5 |
| photo-sensitive adhesive P | EXC 282 (PU acrylate) 8 g (OH value: 42.95 molecular weight: 54734 | SR339 (40.1% phenyl group) 2 g | I-184 (Ciba) 0.1 g | 17 |
| photo-sensitive adhesive Q | EXC 282 (PU acrylate) 7 g (OH value: 42.95 molecular weight: 54734 | SR339 (40.1 phenyl group %) 3 g | I-184 (Ciba) 0.1 g | 15.5 |
| photo-sensitive adhesive R | EXC 282 (PU acrylate) 6 g (OH value: 42.95 molecular weight: 54734 | SR339 (40.1% phenyl group) 4 g | I-184 (Ciba) 0.1 g | 12 |
| photo-sensitive adhesive S | EXC 282 (PU acrylate) 9 g (OH value: 42.95 molecular weight: 54734 | polystyrene (74% phenyl group) 1 g | I-184 (Ciba) 0.1 g | 8 |
| photo-sensitive adhesive T | EXC 282 (PU acrylate) 8 g (OH value: 42.95 molecular weight: 54734 | polystyrene (74% phenyl group) 2 g | I-184 (Ciba) 0.1 g | 4.4 |
| photo-sensitive adhesive U | EXC 282 (PU acrylate) 7 g (OH value: 42.95 molecular weight: 54734 | polystyrene (74% phenyl group) 3 g | I-184 (Ciba) 0.1 g | — |

TABLE 2-continued

Components of photo-sensitive adhesive

| photo-sensitive adhesive | oligomer | reactive monomer | Initiator | Driving voltage ($V_{90}$) |
|---|---|---|---|---|
| photo-sensitive adhesive V | EXC 282 (PU acrylate) 6 g (OH value: 42.95 molecular weight: 54734 | polystyrene (74% phenyl group) 4 g | I-184 (Ciba) 0.1 g | — |

PS: EXC282: Polyurethane acrylate, sold and manufactured by Everwide chemical Co. LTD with the trade No. EX-C282.

SR601:

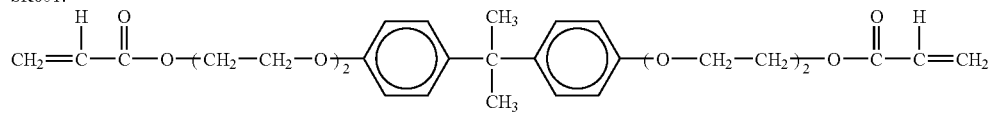

SR602:

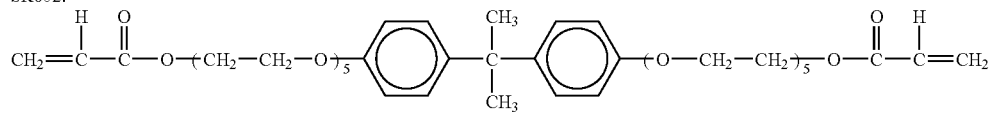

SR348:

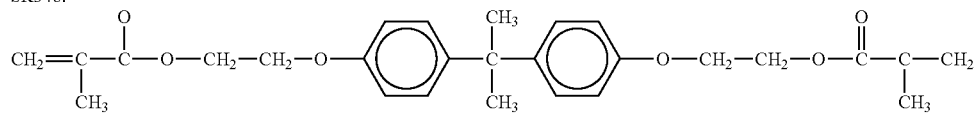

SR339:

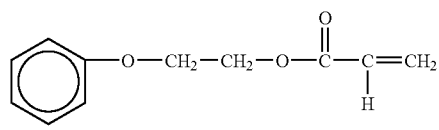

Accordingly, the liquid crystal display had a driving voltage difference of 2.5~9V less than conventional liquid crystal display when the phenyl group of the reactive monomer had a weight ratio of more than 40 wt % base on the total weight of the reactive monomer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A photo-sensitive adhesive for a liquid crystal display, comprising:
    a urethane oligomer, wherein the urethane oligomer has an OH value of more than 40;
    a reactive monomer comprising phenyl group, wherein the phenyl group of the reactive monomer has a weight ratio of more than 40 wt %, based on the total weight of the reactive monomer; and
    a photo initiator.

2. The photo-sensitive adhesive as claimed in claim 1, wherein the urethane oligomer has a molecular weight of more than 20,000.

3. The photo-sensitive adhesive as claimed in claim 1, wherein the reactive monomer comprising phenyl group comprises an acrylic monomer comprising phenyl group.

4. The photo-sensitive adhesive as claimed in claim 1, further comprising a metal salt.

5. A photo-sensitive adhesive for flexible liquid crystal display, comprising:
    60-90% by weight of a urethane oligomer;
    10-40% by weight of a reactive monomer comprising a phenyl group, wherein the phenyl group of the reactive monomer has a weight ratio of more than 40 wt. % based on the total weight of the reactive monomer; and
    0.1-15% by weight of a photo initiator, based on 100% by weight of the urethane oligomer, reactive monomer, and the photo initiator.

6. The photo-sensitive adhesive as claimed in claim 5, wherein the urethane oligomer has a molecular weight of more than 20,000.

7. The photo-sensitive adhesive as claimed in claim 5, wherein the urethane oligomer has an OH value of more than 40.

8. The photo-sensitive adhesive as claimed in claim 5, wherein the reactive monomer comprising phenyl group comprises an acrylic monomer comprising a phenyl group.

9. The photo-sensitive adhesive as claimed in claim 5, further comprising a metal salt.

10. A liquid crystal display, comprising:

a first substrate and a second substrate;

a liquid crystal capsule layer, wherein the liquid crystal capsule layer is formed between the first and second substrates; and a photo-sensitive adhesive as claimed in claim 1 coated on at least one of the first and second substrates and the liquid crystal capsule layer, thereby bonding the liquid crystal capsule layer with at least one of the first and second substrates.

11. The liquid crystal display as claimed in claim 10, wherein the liquid crystal capsule layer comprising a plurality of liquid crystal capsules comprises dichroic dye.

12. The liquid crystal display as claimed in claim 10, wherein the first and second substrates respectively comprises glass or plastic substrate.

13. The photo-sensitive adhesive as claimed in claim 1, wherein the urethane oligomer has a molecular weight of more than 20,000 and an OH value of more than 40.

* * * * *